UNITED STATES PATENT OFFICE.

FRANZ WEBEL, OF MANNHEIM, GERMANY, ASSIGNOR TO BADISCHE ANILIN & SODA FABRIK, OF LUDWIGSHAFEN-ON-THE-RHINE, GERMANY, A CORPORATION.

PRODUCING CHLORIN DERIVATIVES OF THE AMYL SERIES.

1,098,858.

Specification of Letters Patent. Patented June 2, 1914.

No Drawing. Application filed February 27, 1913. Serial No. 751,104.

*To all whom it may concern:*

Be it known that I, FRANZ WEBEL, citizen of the German Empire, residing at Mannheim, Germany, have invented new and useful Improvements in Producing Chlorin Derivatives of the Amyl Series, of which the following is a specification.

When chlorin is allowed to react on trimethyl-ethylene, the chief products formed are chlor-amylenes, but during the reaction some of the hydrochloric acid which is set free combines with unaltered trimethyl-ethylene and tertiary isoamyl chlorid is formed. A mixture thus obtained, containing chlor-amylenes and isoamyl chlorid is unsuitable for the production of isoprene by treatment with an agent capable of splitting off hydrochloric acid, because an isoprene is obtained which contains a considerable amount of trimethyl-ethylene.

I have found that the formation of tertiary isoamyl chlorid can be avoided when reacting with chlorin on trimethyl-ethylene, if the reaction be caused to take place under considerably diminished pressure.

The following example will serve to illustrate further the nature of my invention, which, however, is not confined to this example. Allow chlorin and vaporized trimethyl-ethylene (in the proportion, by volume, of about two of chlorin to three of the vapor) to pass through a lead coil cooled by ice, while maintaining a pressure of about 50 millimeters of mercury. A portion of the reaction product separates out in the coil and can be collected in a suitable cooled vessel, while the remaining vapors are passed through milk of lime in order to absorb the hydrochloric acid, and are then condensed by means of a toluene-carbon-dioxid freezing mixture. The two condensed portions are mixed together and freed from any unaltered trimethyl-ethylene, whereupon a product is obtained consisting of trimethyl-ethylene chlorid and monochlor amylenes. As each of these bodies can be made to give rise to isoprene, the mixture can be employed for this purpose without any further purification being necessary.

Now what I claim is:—

The process of producing chlorin derivatives of the amyl series by reacting with chlorin on trimethyl-ethylene under considerably diminished pressure.

In testimony whereof I have hereunto set my hand in the presence of two subscribing witnesses.

FRANZ WEBEL.

Witnesses:
J. ALEC. LLOYD,
JOSEPH HEIFFER.